United States Patent
Brothier et al.

(10) Patent No.: US 9,943,874 B2
(45) Date of Patent: Apr. 17, 2018

(54) METHOD AND DEVICE FOR GENERATING DROPLETS OVER A VARIABLE SPECTRUM OF PARTICLE SIZES

(75) Inventors: Méryl Brothier, Aix en Provence (FR); Dominique Moulinier, Pierrevert (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 594 days.

(21) Appl. No.: 13/992,605

(22) PCT Filed: Nov. 29, 2011

(86) PCT No.: PCT/EP2011/071297
§ 371 (c)(1),
(2), (4) Date: Jul. 8, 2013

(87) PCT Pub. No.: WO2012/076368
PCT Pub. Date: Jun. 14, 2012

(65) Prior Publication Data
US 2014/0319237 A1    Oct. 30, 2014

(30) Foreign Application Priority Data
Dec. 8, 2010  (FR) .................................... 10 60233

(51) Int. Cl.
*B05B 17/06*    (2006.01)
*B22F 1/00*    (2006.01)
(Continued)

(52) U.S. Cl.
CPC ............ *B05B 17/0676* (2013.01); *B01J 2/04* (2013.01); *B01J 2/18* (2013.01); *B22F 1/0096* (2013.01);
(Continued)

(58) Field of Classification Search
CPC ..... B01J 2/18; G21C 3/44; G21C 3/46; G21C 3/48; G21C 3/50
(Continued)

(56) References Cited

U.S. PATENT DOCUMENTS 3,439,633 A * 4/1969 Kazimierz ................ A61J 3/06
                                                   264/13
3,720,737 A * 3/1973 Klaphaak ................... B01J 2/04
                                                   264/13
(Continued)

FOREIGN PATENT DOCUMENTS

FR    1541739    10/1968
FR    2258916    8/1975
(Continued)

OTHER PUBLICATIONS

Office Action in Japanese Patent Application No. 2013-542461, dated May 12, 2015.

*Primary Examiner* — Arthur O Hall
*Assistant Examiner* — Tuongminh Pham
(74) *Attorney, Agent, or Firm* — Baker & Hostetler LLP

(57) ABSTRACT

A process for generating droplets with a modulatable droplet size distribution, comprises: making a stream of liquid strike a support with a given relative impact velocity; making said support vibrate at at least one vibration frequency; heating said support to a impact temperature such that the liquid film formed by the impact and made to vibrate is heated to a principal temperature to form in combination what are called principal droplets from said film; and transporting said droplets via a transfer/braking/sorting system to a liquid for precipitating the principal droplets, said transportation being carried out at a transportation temperature, all of these parameters, namely the relative impact velocity, the vibration frequency, the principal temperature and the transportation temperature allowing the droplet size of said formed (Continued)

principal droplets and the velocity of the latter to be modulated. A device allowing the process to be implemented is also provided.

27 Claims, 9 Drawing Sheets

(51) Int. Cl.
*C01G 43/00* (2006.01)
*C01G 43/01* (2006.01)
*G21C 3/62* (2006.01)
*B01J 2/04* (2006.01)
*B01J 2/18* (2006.01)

(52) U.S. Cl.
CPC ............. *C01G 43/00* (2013.01); *C01G 43/01* (2013.01); *G21C 3/62* (2013.01); *G21C 3/623* (2013.01); *Y02E 30/38* (2013.01)

(58) Field of Classification Search
USPC ......... 239/102.1, 102.2; 264/5–14; 425/6, 7, 425/10, 9; 376/356
See application file for complete search history.

(56) References Cited

U.S. PATENT DOCUMENTS

| | | | | |
|---|---|---|---|---|
| 4,285,645 A | * | 8/1981 | Bezzi | B01J 35/08 264/13 |
| 4,302,166 A | * | 11/1981 | Fulwyler | B01J 13/04 264/9 |
| 4,359,434 A | * | 11/1982 | Tiberg | B22F 9/08 264/12 |
| 4,386,896 A | | 6/1983 | Ray | |
| 4,563,335 A | * | 1/1986 | Akiyama | C01G 43/025 159/29 |
| 4,613,076 A | | 9/1986 | Dietz et al. | |
| 5,186,948 A | * | 2/1993 | Takei | B01J 13/04 264/14 |
| 6,446,878 B1 | * | 9/2002 | Chandra | B05B 9/04 222/420 |
| 6,629,646 B1 | * | 10/2003 | Ivri | A61M 11/005 239/102.2 |
| 7,244,377 B2 | * | 7/2007 | Shrader | B01J 2/18 264/8 |
| 7,766,253 B2 | | 8/2010 | LePesant et al. | |
| 7,863,560 B2 | | 1/2011 | Schaumloffel et al. | |
| 2003/0057579 A1 | * | 3/2003 | Wollmann | A23D 9/007 264/5 |
| 2010/0078499 A1 | | 4/2010 | Sulzer et al. | |
| 2010/0237048 A1 | | 9/2010 | Brothier et al. | |
| 2011/0068497 A1 | * | 3/2011 | Ahlin Grabnar | A61K 9/1647 264/9 |

FOREIGN PATENT DOCUMENTS

| | | |
|---|---|---|
| FR | 2440775 | 6/1980 |
| JP | S58-95555 A | 6/1983 |
| JP | H05-279043 A | 10/1993 |
| JP | H07-80360 A | 3/1995 |
| JP | 2003-266034 A | 9/2003 |
| JP | 2004-074015 A | 3/2004 |
| JP | 2005-272172 A | 10/2005 |
| WO | 2005/102537 A2 | 11/2005 |
| WO | 2006048523 A1 | 5/2006 |
| WO | 2006131626 A2 | 12/2006 |
| WO | 2009/047284 A1 | 4/2009 |

* cited by examiner

METHOD AND DEVICE FOR GENERATING DROPLETS OVER A VARIABLE SPECTRUM OF PARTICLE SIZES

CROSS-REFERENCE TO RELATED APPLICATIONS

This application is a National Stage of International patent application PCT/EP2011/071297, filed on Nov. 29, 2011, which claims priority to foreign French patent application No. FR 1060233, filed on Dec. 8, 2010, the disclosures of which are incorporated by reference in their entirety.

FIELD OF THE INVENTION

The field of the invention is that of processes and devices for generating droplets notably in applications for synthesizing spherules (or spheroids) of nuclear fuel materials.

BACKGROUND

This type of process/device may typically be incorporated in a more general process for manufacturing nuclear fuels using sol-gel techniques (i.e. techniques exploiting precipitation reactions). This type of process makes it possible to limit dispersion of potentially radioactive/contaminant substances during the production of spherules/spheroids of fuel materials, these spheroids, of controlled size and shape, themselves subsequently being (potentially) incorporated into fuel elements potentially manufactured using deposition techniques (fuel of the TRISO/VHTR type, for example), the acronym VHTR in expressions such as "VHTR cycle" standing for "very high-temperature reactor" and the acronym TRISO in the expression "TRISO fuel" standing for tristructural-isotropic, TRISO fuel being a specific type of fuel micro-particle. The latter particle has a spherule of fissile material composed of UOx (sometimes UC or UCO) at its center, this central spherule being coated with four layers of three isotropic materials. The four layers are a porous buffer layer made of carbon, an internal dense layer of pyrolytic carbon (PyC), a ceramic layer of SiC used to keep the fission products at high temperatures and to reinforce the structural integrity of the TRISO particles, and an external dense PyC layer. It is also possible and preferable to use vibrocompaction techniques to produce said spheroids, the range of particle sizes targeted in the latter case being wider and potentially more difficult to achieve.

Thus, droplets of fuels dissolved in a liquid phase that are precipitated using a conventional GSP (gel supported precipitation) sol-gel process have been developed, these droplets having properties and production conditions suitable (in terms of sphericity, droplet size, generation rate, etc.) for the subsequent synthesis of solid spheroids that can be used in more global processes for producing nuclear fuels such as illustrated in FIG. 1 (mainly with application to vibrocompaction in comparison to V/HTR applications, which tolerate relatively large spherule diameters, i.e. diameters larger than 300 μm) which illustrate all of the following steps:

step 1: a solution containing the dissolved fuel is prepared;
step 2: droplets of controlled size and shape are generated;
step 3: a gel supported sol-gel process is used;
step 4: solid spheroids are produced;
step 5: said spheroids are deposited, or in step 5a: vibrocompaction is used to fill a fuel cladding; and
step 6: V/HTR fuel elements are produced, or in step 6a: fuel obtained by vibrocompaction is produced.

In the prior art, droplets are generated by a number of devices/processes. Nevertheless, in the context of the aforementioned situation (generation of spheroids for the manufacture of nuclear fuel) a certain number of specific constraints/objectives mean that certain prior-art techniques must be selected. It will be noted that the sol-gel precipitation process is an effective method of limiting the risk of contaminant dispersal since it does not employ radioactive powders. In contrast, in this technology the risk of blockage and the size and shape of the solid spheroids, precipitated in order subsequently to be used in a more global manufacturing process, must be controlled as is illustrated in FIG. 2, which schematically shows the deformation that droplets $G_{ou}$ experience when they strike a given liquid surface S (typically the precipitation solution) or, more precisely, the variation over time of the diameter ratios $D_{max}/D_{min}$ in two directions, respectively parallel and perpendicular to said struck surface, and showing a variation Δ in sphericity.

Thus, the droplets must themselves have:
controlled sizes and shapes (typically in a range that may range from a few tens to a few hundred microns and with a sphericity ratio ($D_{max}/D_{min}$) lower than 1.1); and
the droplet generation rate must ideally be low (in order to limit deformation of the droplets (characterized by the aforementioned sphericity ratio) when they strike the liquid containing the element enabling precipitation in the context of the sol-gel process).

Generally, the main technologies discernible in the prior art for generating droplets are the following:

—Nebulization Using a Jet of Gas:

This technique is quite common and is exploited in various industries. It employs, to cause a liquid to fragment, kinetic energy delivered by the relative movement (relative to the liquid to be fragmented) of a gas generating a high shear force and consequently the subsequent desired fragmentation. Examples of this technology are notably described in patent applications US 2010/0078499 and EP 1 888 250. The main drawback of this type of technology is that it employs jets of gas, which are disadvantageous in the nuclear industry (because they make contact with a contaminant they are a source of gaseous waste requiring filtering). Moreover, these types of droplet generator frequently become blocked due to the need for the liquid feed outlet to have a limited cross section so as not to increase the flow rate of the gas used to nebulize the liquid. This limitation results in a high risk of blockage, it being very disadvantageous in the nuclear industry to have to carry out repair/maintenance work on devices used to process radioactive material (respecting the ALARA principle: the ALARA principle is one of the basic principles of ionizing radiation protection. The objective being to reduce the individual and collective dose received by the personnel of nuclear service providers).

—Generation of Droplets Using a Vibrating Injector:

This technology is widely used in sol-gel processing to generate calibrated droplets. In this type of technology, a liquid jet flows under gravity through a calibrated orifice subjected to vibration at a given frequency thus fragmenting the jet into monodisperse droplets. In devices with vibrating orifices (example described in patent application WO 2006/048523) the jets are almost cylindrical and the diameter of the droplets generated is about twice that of the orifice. This greatly limits the usefulness of this technology and results in a high risk of blockage that only increases as the diameter of the desired droplets decreases. It will also be noted that in order to be able to change notably the diameter of the droplets generated by this type of generator, it is necessary to change the diameter of the nozzle through which the jet is emitted, which is moreover not a degree of freedom often required by industry and contradicts the aforementioned ALARA principle. In addition, this type of injector is limited to generating small droplets (smaller than 100 μm in size) for high viscosity (typically higher than 50 cp) liquids, as illustrated in FIGS. 3 and 4, which respectively show the variation in the head loss in a straight outlet injector as a function of the diameter $D_{inj}$ of the injector, and the variation in the time before a straight outlet injector becomes blocked $T_{av/Bou}$ for ejection of a viscous liquid such as, for example, an aqueous solution rich in polyvinyl acetate (PVA), the parameter $D_{min}$ corresponding to the minimum diameter before the head loss becomes too great.

—Generation of Droplets by Fragmenting a Liquid Jet Using a Mechanical Rotary Effect:

This type of device allows a jet to be fragmented via the mechanical shear force induced by a moving (most often in rotation) stop that makes contact (at high speed) with the liquid jet. This type of device, also called a jet-on-surface impinging atomizer, is accompanied by a substantial loss of material (low yield) which may be disadvantageous for industrial production, the droplets thus produced also having emission speeds close to the speed of the element that cuts the jet (or the speed of the incident liquid), thereby failing to achieve the aforementioned objective.

—Generation of Droplets Using Ultrasound:

In this type of technology, the free surface of a liquid to be fragmented is excited by a source of acoustic waves. Columns of liquid appear at the surface of the liquid, from which columns very small droplets escape with a quite wide droplet size dispersion, this type of generator moreover not allowing droplets having a diameter greater than a few tens of microns to be easily produced. Moreover, since the droplets are near the liquid source, it is not easy to carry out a step of gelling the droplets thus formed without running the risk of precipitating the liquid source itself. Moreover, the fragmentation is constrained by the natural resonant frequency of the free surface of the liquid. The degree of freedom for adjusting the droplet diameter thus achievable is almost nonexistent, which is a substantial limitation from a processing point of view.

—Generation by Atomization (Rotary Optionally Vibrating Device):

This type of device is based on the use of a centrifugal force to produce a liquid film on the surface of a rotating member. At the periphery of this member (often a disk or a wheel) droplets are generated; whether the droplets form and their size depend on the parameters of the rotation (notably the rotation speed), the surface finish of the rotary element, and the physico-chemical properties of the liquid to be atomized. The fluids that the solution of the present invention proposes to fragment are liable to lead to blockage-type effects; it is not viable to base the fragmentation (as described in patent application WO 2005/102537) on the surface finish and characteristic size of elements (often called teeth) that have a geometry that is necessarily subject to change due to clogging-related effects. Moreover, the emission velocity of the droplets is intrinsically high (of the same order as the linear speed of rotation of the rotating plate) making it difficult to obtain spheroids by gelling the droplets via impact with a precipitation solution. Furthermore, rotary atomizers are not very suitable for fragmenting viscous liquids since they require communication of a high rotation speed; moreover, stability of the fragmentation then causes control-related problems.

—Generation of Droplets Using Impinging Jets:

This type of device, which is notably described in patent application WO 2009/047284, generates droplets by making impinging jets strike one another. This type of generator leads to, if it is not used under specific conditions such as those for which it was developed (very hot medium such as a flame or a plasma cone), a disadvantageous loss of liquid. Moreover, the emission velocity of the droplets is of the same order as the strike velocity of the liquid jets, again failing to achieve the aforementioned objectives/meet the aforementioned constraints.

Thus, of all of the techniques known in the art, no technology for generating droplets allows all of the following criteria to be met:

generation of droplets via fragmentation of potentially (highly) viscous liquids;

generation of droplets of liquid capable of being subjected to precipitation or other effects leading to a high risk of blockages;

generation of droplets of liquid capable of being emitted at low droplet speeds (possibly as low as 0.1 m/s or even less); and generation of droplets with a wide and adjustable droplet size distribution (from a few tens of microns to a few hundred microns).

It will be noted that certain of these objectives and/or constraint functions are antinomic/contradictory, especially as regards the following desired outcomes:

fragmentation of viscous liquids without emission of droplets at high speeds. Specifically, high viscous forces conventionally require high kinetic energies or shear forces to be used which consequently induce sprays/the generation of high-speed droplets; and generation of droplets of small size without using elements sensitive to blockage effects. Specifically, in most droplet generators the droplets are obtained using mechanical elements the size of which is about the size desired for the droplets to be generated. This size is either the diameter of the actual injector when the technology employed is based on this type of element (the size of the droplet then being about twice the diameter of the outlet), or the size of profile elements (teeth, needles, etc.) allowing instabilities to be generated or shear forces to be applied inducing the fragmentation of elementary volumes the size of which is similar to that of these elements.

SUMMARY OF THE INVENTION

This is why, and in this context, the subject of the present invention is a process for generating low-speed droplets with a modulatable droplet size distribution in which there is no risk of blockages forming, characterized in that it comprises the following steps:

making a stream of liquid strike a support with a given relative impact velocity;

making said support vibrate at at least one vibration frequency;

heating said support to a temperature called the impact temperature such that the liquid film formed by the impact and made to vibrate is heated to what is called a principal temperature so as to form in combination what are called principal droplets from said film; and transporting said droplets via a transfer/braking/sorting system to a liquid for precipitating the principal droplets, said transportation being carried out at what is called a transportation temperature, all of these parameters, namely the relative impact velocity, the vibration frequency, the principal temperature and the transportation temperature allowing the droplet size of said formed principal droplets and the velocity of the latter to be modulated.

According to one variant of the invention, the process furthermore comprises a step of prefragmenting said liquid so as to produce primary droplets, which primary droplets strike said support with a medium flow rate that may possibly typically be about 0.1 to 1 liter per hour.

According to one variant of the invention, the prefragmenting step is carried out by making said liquid vibrate and may possibly be carried out notably through a nozzle at what is called a preliminary frequency.

According to one variant of the invention, the process comprises making said support vibrate during a first period and with a first vibration amplitude so as to influence the impact velocity of said primary droplets, and making said support vibrate during a second period and with a second amplitude so as to adjust the droplet size of the principal droplets by way of the film obtained from the primary droplets, these steps possibly being concomitant.

According to one variant of the invention, the jet is continuous in order to obtain a high droplet flow rate.

According to one variant of the invention, said support makes an angle ($\theta_1$) smaller than about ten degrees with a direction normal to the direction of said continuous jet of fluid.

According to one variant of the invention, the process furthermore comprises a step of subjecting the primary droplets and/or the principal droplets formed to an electric field so as to reduce coalescence of said droplets and to allow braking/sorting via an electrostatic effect.

According to one variant of the invention, the impact temperature is located between the boiling point of the liquid to be broken up and the Leidenfrost temperature of the desired principal droplets, the transportation temperature belonging to a range of temperatures near said Leidenfrost temperature.

According to one variant of the invention, the transportation of said principal droplets is carried out at what is called a transportation temperature, this transportation temperature being different from what is called the principal temperature.

According to one variant of the invention, the liquid is a viscous liquid possessing a viscosity higher than about ten centipoises at room temperature and possibly notably being a uranyl nitrate solution or an actinide solution containing a rheology adjusting additive such as polyvinyl alcohol (PVA).

According to one variant of the invention, the film formed is about a few tens to a few hundred microns in thickness.

Advantageously, the vibration frequencies are about a few hertz to a few hertz to a few tens of kilohertz.

According to one variant of the invention, the impact velocity is about a few centimeters/second to about a hundred meters/second.

According to one variant of the invention, all of the steps are carried out in a chamber that is under vacuum relative to the atmosphere outside said chamber.

Another subject of the invention is a device for generating droplets with a modulatable droplet size distribution, characterized in that it comprises:
  means for spraying a liquid onto a support so as to make said liquid strike said support;
  means for adjusting the impact velocity of said liquid;
  means for making said support vibrate at a principal frequency and means for heating said support to a temperature such that said liquid is heated to what is called a principal temperature so as to form what are called principal droplets from said film; and
  means for transporting said principal droplets to a storage compartment, said transportation being carried out at what is called a transportation temperature.

According to one variant of the invention, the device comprises a reservoir of pressurized liquid and an injector for the prefragmentation.

According to one variant of the invention, the spraying means spray a continuous flowing film onto the support to be struck and said support has a surface that is not flat and that may possibly have a concave axisymmetric three-dimensional and notably hemispherical shape.

According to one variant of the invention, the means for spraying the liquid comprise means for prefragmenting said liquid into primary droplets and means for spraying said primary droplets onto said support.

According to one variant of the invention, the means for prefragmenting the liquid into primary droplets comprise a straight or tapered outlet of the nozzle type.

According to one variant of the invention, the prefragmenting means comprise an ultrasound generator possibly comprising a piezoelectric transducer producing vibrations at what is called a preliminary frequency.

According to one variant of the invention, the prefragmenting means furthermore comprise an anti-overflow system.

According to one variant of the invention, the support comprises guiding grooves for collecting the principal droplets.

According to one variant of the invention, the means for making the support vibrate comprises a piezoelectric element.

According to one variant of the invention, the collecting means comprise means for transporting said principal droplets to a solution for precipitating the droplets.

According to one variant of the invention, the transporting means comprise electromagnetic braking means.

According to one variant of the invention, the transporting means comprise a ramp inclined relative to said support.

According to one variant of the invention, the transporting means furthermore comprise means for sorting said principal droplets.

According to one variant of the invention, the transporting/braking means comprise a carousel receptacle actuated in rotation.

According to one variant of the invention, the device comprises a controlled-pressure chamber comprising the means for spraying said liquid, said support and the means for making said support vibrate, and means for creating a vacuum in said chamber.

BRIEF DESCRIPTION OF THE DRAWINGS

The invention will be better understood and other advantages will become apparent on reading the following non-limiting description and by virtue of the appended figures, in which.

DETAILED DESCRIPTION

Figure 1:
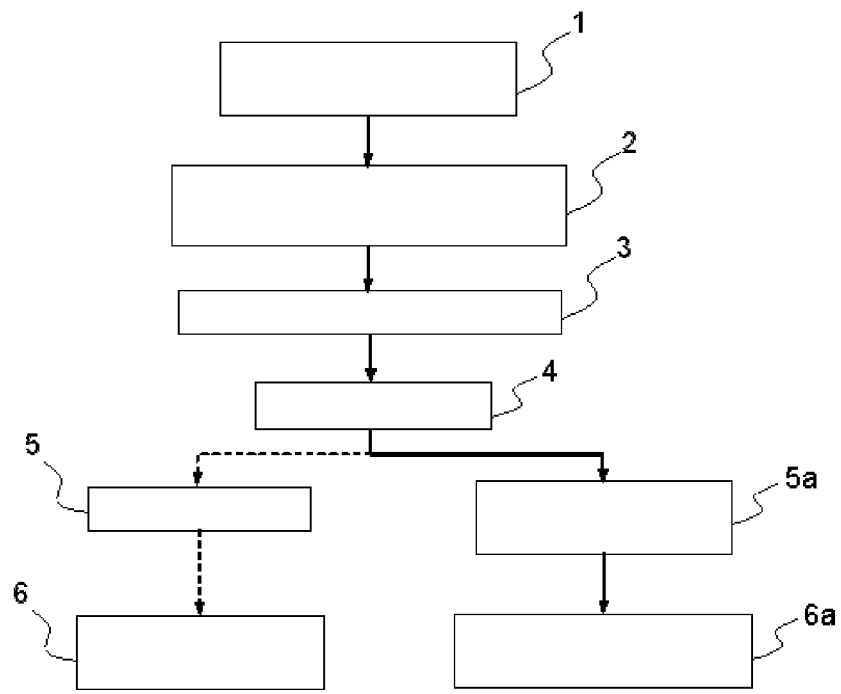
FIG. 1 illustrates the various steps in a process for manufacturing nuclear fuel elements, into which the present invention may be incorporated.
Figure 2:
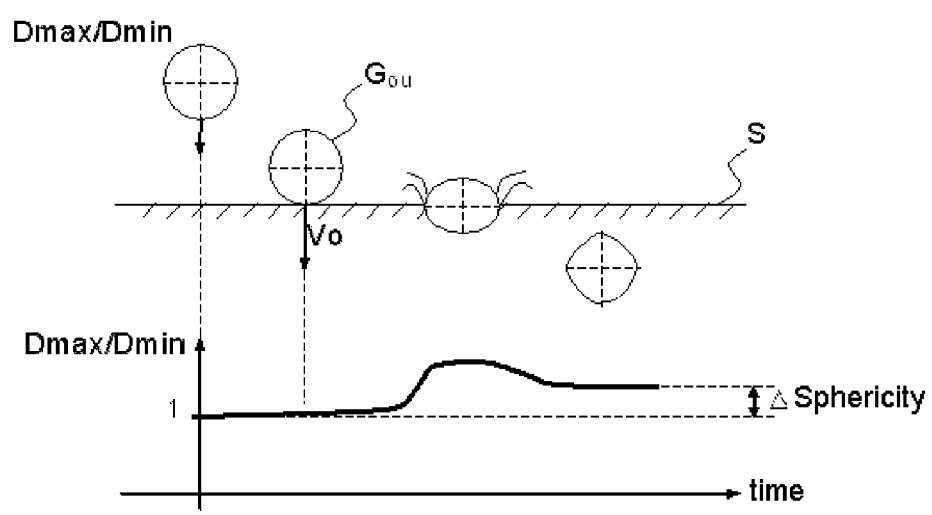
FIG. 2 illustrates the change in the sphericity of droplets subjected to gel supported precipitation on striking a liquid surface formed by a solution containing a precipitation reagent.
Figure 3:
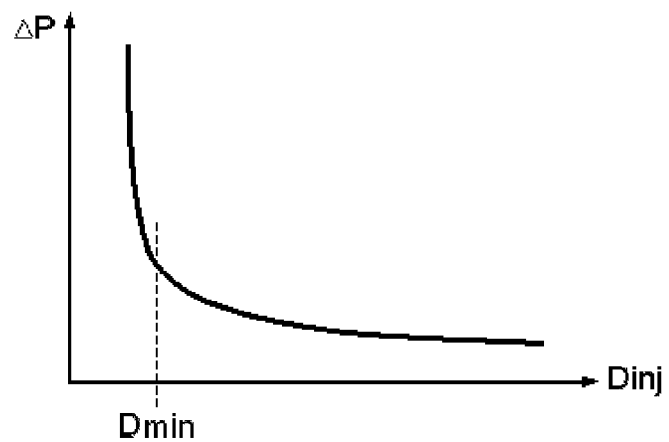
FIG. 3 illustrates the variation in the head loss in a straight outlet injector as a function of the diameter of the injector.
Figure 4:
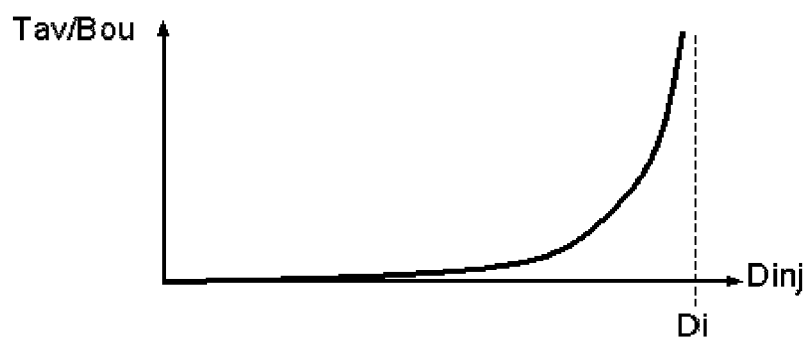
FIG. 4 illustrates the variation in the time before a straight outlet injector becomes blocked for ejection of a viscous liquid such as an aqueous solution rich in PVA.
Figure 5:
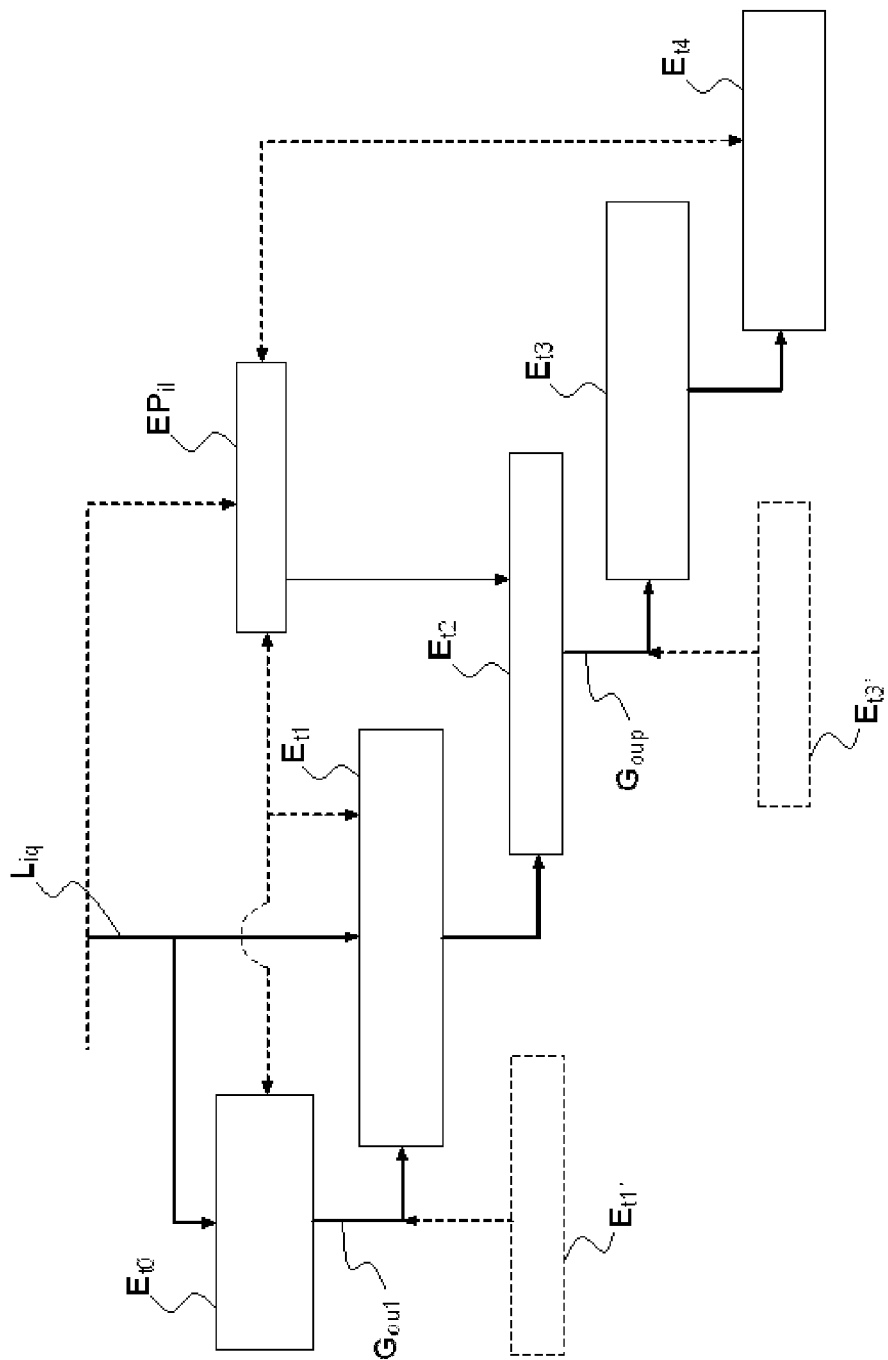
FIG. 5 illustrates a block diagram of the various steps in the process for generating droplets according to the invention.

The process of the present invention is presented schematically by virtue of the diagram in FIG. 5, which synthetically illustrates all the main constituent steps of the process, and certain optional or alternative steps of said process:

- in an optional initial step $Et_0$ in the process of the present invention, the liquid is fragmented in order to obtain a set of primary droplets $G_{ou1}$;
- according to one variant of the invention, the initial step may be supplemented with what is called an electrical charging operation $E_{t1'}$, the aim of which is to keep said primary droplets isolated from one another;
- generally, and in a first step $Et_1$, a liquid film is produced from a liquid Liq taking the form of a continuous jet, or from each of the primary droplets $G_{ou1}$, via impact with a support;
- next, this film, in a step $Et_2$, is subjected to vibrations and a suitable temperature in order to fragment said film so as to obtain a set of principal droplets $G_{oup}$ of calibrated droplet size;
- next, in a step $Et_3$, said principal droplets are transported, it advantageously being possible to carry out what is called an electrical charging step $E_{t3'}$, the aim of which is to keep said principal droplets isolated from one another; and
- lastly, a step $Et_4$ of transporting/sorting/braking said principal droplets is carried out, this step possibly, according to certain variants, advantageously comprising guiding and sorting of said droplets notably using electrostatic forces.

It will be noted that all of these operations may advantageously be controlled by a central control operation $E_{Pil}$.

Generally and according to the process of the present invention, a first step, called an impact step, is provided, this step consisting in spraying a pressurized fluid onto a support, typically a supporting plate, in order to form a film intended to be fragmented in order to form the desired droplets.

In a first variant of the invention, an initial step of prefragmenting the liquid from which it is desired to form droplets of controlled droplet size is provided in the context of the implementation of a medium flow rate.

Figure 6:
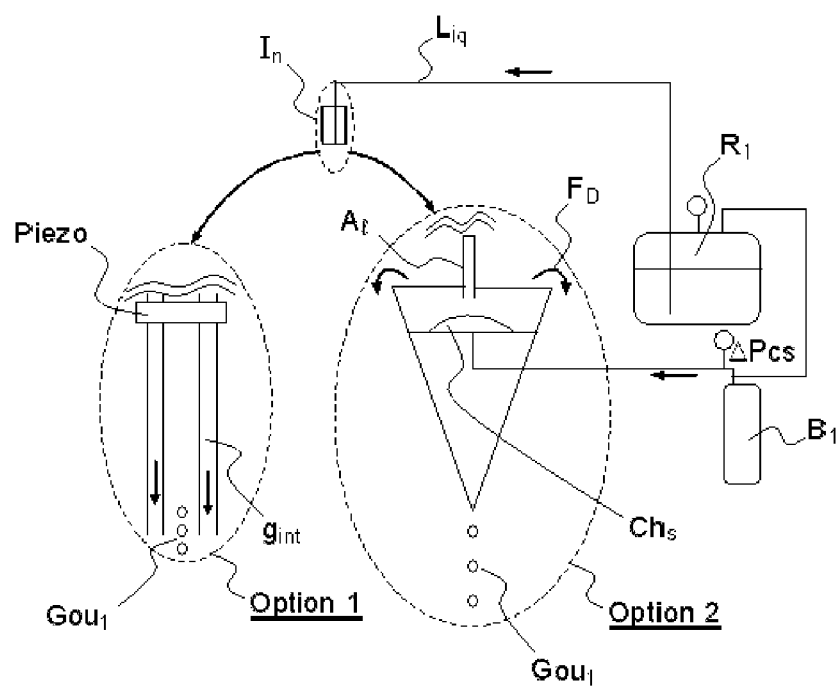
FIG. 6 illustrates the first step in the process of the invention in accordance with two possible ways of carrying out the prefragmenting step.

As illustrated in FIG. 6, this liquid comes from a pressurized reservoir $R_1$. The liquid is sent to an injector In. According to this variant, a subsystem capable of prefragmenting a fluid is also provided.

Such a subsystem may comprise, as illustrated in FIG. 6, a straight or tapered outlet, possibly of the nozzle type, with a diameter of at least 200 microns so that viscous liquids can be used without a high risk of blockage, and optionally possessing a flushing system notably ensured by a flow of inert gas $g_{int}$ in order to limit the risk of blockage notably due to precipitation effects, corresponding to option 1. A quartz crystal piezoelectric actuator $P_{iezo}$ allows a stream of primary droplets $G_{ou1}$ to be generated from the injected liquid Liq.

Alternatively, and corresponding to option 2, the prefragmentation may be ensured by an overflow system fed via a feed $A_f$, illustrated by arrows showing the overflow $F_D$, eliminating any risk of blockage at the outlet of any nozzle, and comprising a flexible chamber $Ch_s$ connected to a compressed gas cylinder $B_1$ or indeed even emerging into the solution to be distributed so that the outlet section does not make contact with the surrounding atmosphere rich in the vapor of the precipitation product (ammonia for example).

The droplets generated $G_{ou1}$ plumb with the outlet have a diameter $d_0$ set by the volume flow rate Q which is controlled by the pressure of the reservoir R1 and the frequency f of the piezoelectric crystal. This diameter $d_0$ is given to the $1^{st}$ order approximately by the following expression:

$$d_0 = \sqrt[3]{\frac{\alpha Q}{\pi f}},$$

where $\alpha$ is a constant dependent notably on the diameter of the orifice of the outlet.

For option 2, the diameter depends on the physico-chemical properties of the overflow, on its flow rate, and on the geometry and surface finish of the surface supporting the prefragmentation (gravitational in this case).

Figure 8:
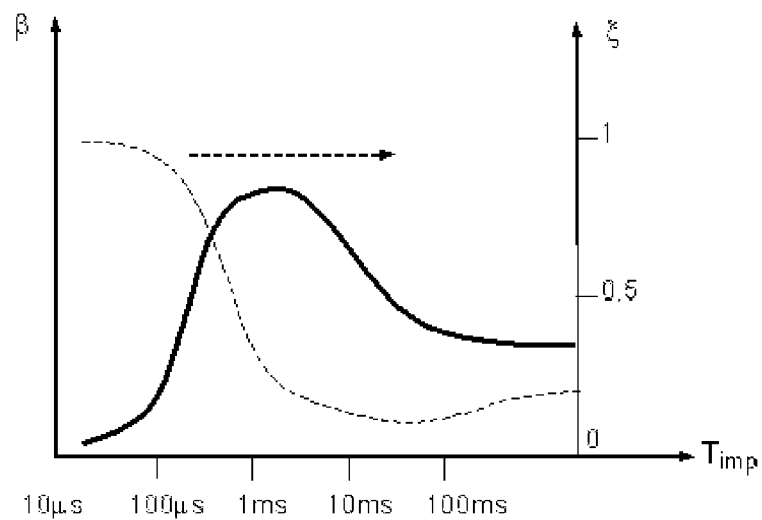
FIG. 8 illustrates the typical variation in the coefficients $\beta$ and $\xi$ as a function of time post-impact $T_{imp}$.

The droplets generated by the subsystem described above are made to impact against a solid wall. Generally, when a droplet strikes a flat solid surface, a liquid film is generated the shape of which, on the solid surface, may be described by the parameters $\beta$ and $\xi$ such as defined below:

$$\beta = \frac{D}{D_0},$$

where D is the diameter of the film of liquid, varying as a function of time, and $D_0$ is the initial diameter of the droplet before the impact; and $$\xi = h/D_0,$$

where h is the height of liquid produced by the droplet striking the wall and varying as a function of time (see FIG. 8).

The parameter β varies over time until a certain threshold is reached, this threshold corresponding to the fact that the amount of movement in the liquid is equivalent to the forces induced by the surface tension tending to keep the fluid within a restricted area. The maximum value of this threshold is mainly a function of the Weber number We.

Approximately:

$$\beta_{max} \# We^{0.25},$$

where We is the Weber number, used in fluid mechanics to characterize the flow of fluids at the interface of a multiphase system. It corresponds to the ratio of inertial forces to the surface tension.

It is defined in the following way:

$$We = \frac{\rho \cdot v^2 L_c}{\sigma},$$

where:
v: speed;
$L_c$: characteristic length;
ρ: density; and
σ: surface tension.

Figure 7:
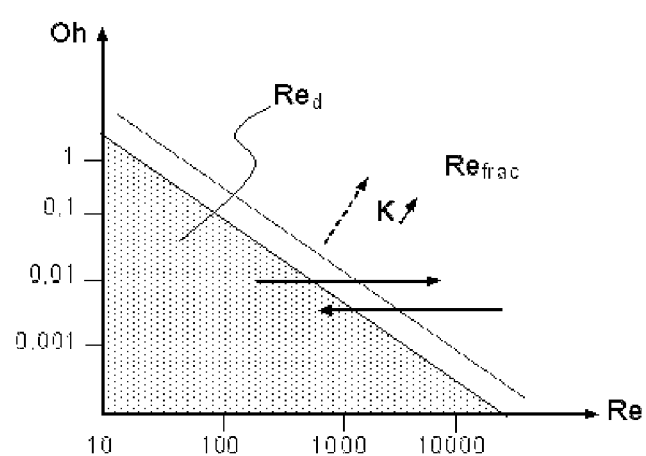
FIG. 7 illustrates the deposition conditions of a liquid film as a function of the Reynolds number Re and the Ohnesorge number Oh.

Beyond this threshold, the liquid surface contracts or then, under certain conditions, naturally fragments forming secondary droplets as illustrated in FIG. 7, which shows the deposition conditions of a liquid film as a function of the Reynolds number Re and the Ohnesorge number Oh $$\left( Oh = \frac{\mu}{\sqrt{\rho . \sigma . d}} \right)$$

where $K = We^{0.5} Re^{0.25}$, and exhibits a region $Re_{frac}$ of natural fragmentation relative to a deposition region $Re_d$.

In other cases, the initial droplet may be observed to rebound, which is not desired in the context of the present invention.

In addition to the parameter β it is possible to introduce the parameter ξ, which describes the ratio of the height of the deformed droplet post-impact to the initial diameter of said droplet. FIG. 8 illustrates the typical variation of the parameters β and ξ as a function of time post-impact $T_{imp}$.

It will be noted that the time taken for the maximum value of β to be reached is only weakly dependent on the nature of the fluid and the injection conditions, at the very least under fairly conventional impact conditions (i.e. for speeds no greater than a few tens of meters per second and for Newtonian fluids). In this sense, for many cases, the order of magnitude of the maximum spreading time is about a millisecond. Over this length of time the inertial forces causing the liquid to spread are greater than the surface tension-related forces that oppose the spreading.

Figure 9A:
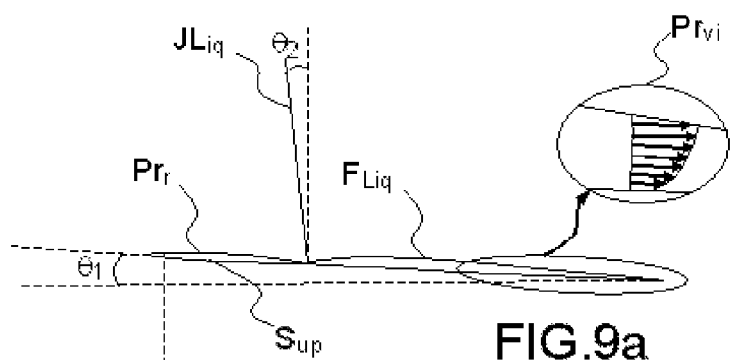
FIGS. 9a and 9b illustrate various profiles for variations in the parameters of droplets deposited on a flat solid surface inclined relative to the normal to the direction of a sprayed jet of liquid.
Figure 9B:

According to a second variant of the invention, and in general when it is a question of generating droplets with high flow rates, it is possible that it may be chosen to generate a liquid film, without prefragmentation into droplets, by direct impact of a continuous jet onto a plate such as shown in FIGS. 9a and 9b, respectively side and top views of a liquid layer $N_{Liq}$ formed from a jet $J_{Liq}$ of liquid, which figures illustrate a system for generating a liquid film having as parameters for controlling the thickness of the liquid the angles $\theta_1$, $\theta_2$ and the ejection speed, and which show the back profile $Pr_r$ and the front profile $Pr_{vi}$ of the film.

In order to obtain a very thin film, it is preferable to give the jet of liquid a velocity the vector of which is possibly not normal to the surface of said plate and instead forms an angle θ, which is kept small (smaller than 10°), to the normal to the plate. This makes it possible to impose a preferred course on the flow in the direction desired for the subsequent collecting of the droplets that are generated after fragmentation of the film.

Figure 10:
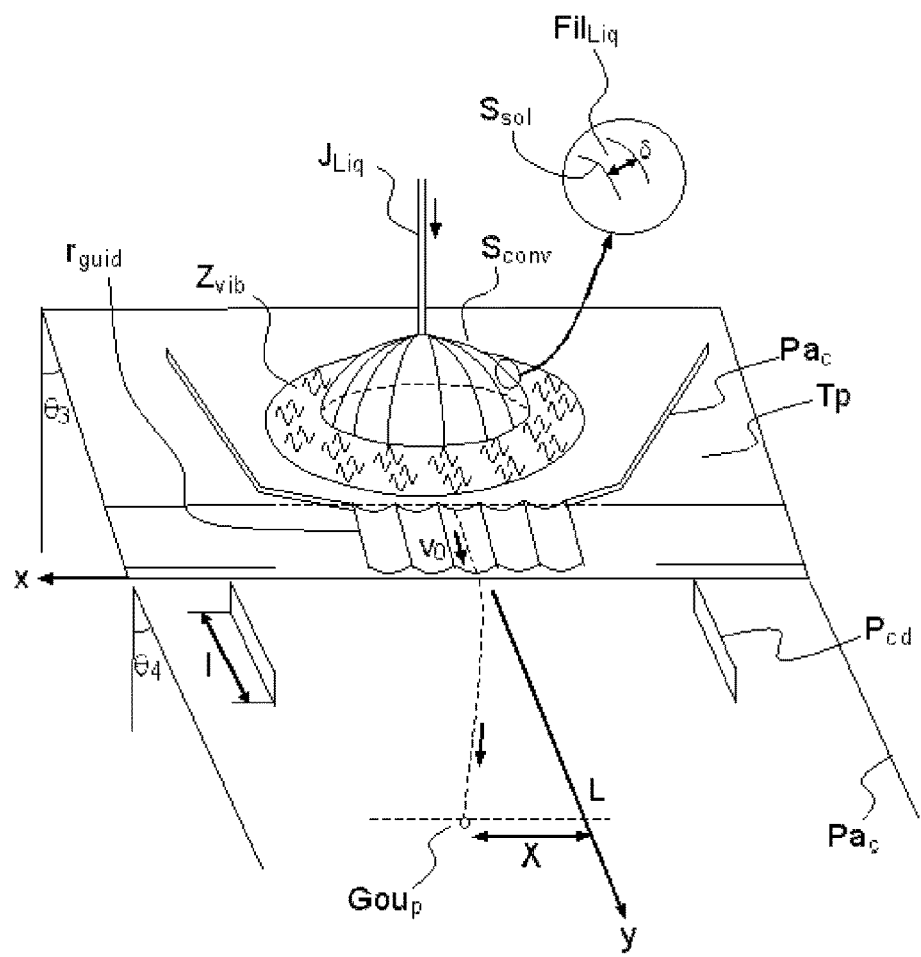
FIG. 10 illustrates a system for generating principal droplets from a liquid jet, incorporating a system for transporting and sorting said droplets.

FIG. 10 illustrates in this respect a variant in which a nonplanar surface is used as the support, the support being made to vibrate in order to create vibration zones $Z_{vib}$. Thus, a jet $J_{Liq}$ of liquid strikes a convex surface $S_{Conv}$. An enlarged view shows the interaction of the liquid film and the solid surface. In order to obtain the temperature desired for forming the droplets $G_{oup}$, heating walls $Pa_c$ are provided.

According to this variant, guiding grooves $r_{guid}$ are provided in order to collect the principal droplets formed, the assembly being placed between capacitor plates $p_{cd}$ that are components of electrostatic collection means.

In this case, the thickness of the film is dependent on the intrinsic properties of the liquid but also on the velocity of the jet. Moreover, on the periphery of the wet surface, in the case where the latter is for example flat, lines of liquid flow converge and form thicker liquid zones (compared to the thickness of the film in the central zone of the wet surface). In order to limit the influence of this effect, it is thus proposed, according to the present variant, to use nonplanar surfaces such as those provided by hemispheres or more generally certain concave axisymmetric three-dimensional shapes (for example cones, ovoids, etc.).

The thickness of the liquid film may be approximated for the case of a Newtonian liquid in the steady flow regime by the following relationship:

$$\delta = \sqrt[3]{\frac{3\eta Q_v}{\rho g W}}$$

where W=S/δ (S being the cross-sectional area of the liquid), Qv is the volume flow rate of the liquid, and δ is the viscosity in Pa·s.

If the thicknesses of the liquid films obtained by spreading droplets and the thicknesses of those obtained by flowing a liquid over a surface are compared, they may be considered to have similar orders of magnitude (250 μm for a film of water flowing over a hemisphere and 100 to 200 μm for the thickness of the film produced by the impact of a water droplet 1 mm in diameter for a velocity of impact near one m/s). It will nevertheless be noted that viscosity may have a non-negligible influence on the thickness of the film and the flow area of the film and that beyond a certain flow area (corresponding to the characteristic length of the latter), for a given volume flow rate, it is no longer expected that a decrease in the thickness of the liquid film will be observed (the wettability limit is reached). This limit may be approximated using the curves 12a and 12b in FIG. 12, which show a slower variation in the film thickness despite the continued increase in the flow area (for a given flow rate).

Thus, the thickness limit of a high-viscosity film (for example the broth, corresponding to a solution of uranyl nitrate and PVA, of FIG. 12b) having a viscosity of 60 cp (at room temperature) may be considered to be about 400 µm whereas a thickness of 100 µm is obtained in the case of water which has a viscosity near 1 cp at room temperature (FIG. 12a).

The inventor has observed that it may be particularly beneficial to work under a vacuum thereby making it possible to limit the following:
the liquid/solid contact angle (and therefore the thickness limit of the film); and
the tendency of the liquid to fragment during the liquid/wall impact, corresponding to an effect called a "splash" or even "splashing".

The pressure threshold Pc below which natural fragmentation is no longer observed depends on the impact velocity and kinematic viscosity ($10^{-6}$ centiStokes (cSt) for water at 20° C.). To a first approximation, this threshold may be given by the following relationship:

$$P_c = \frac{-a.Vo + b}{(v_L/c)^{0.5}},$$

expressed in kPa where a, b and c are constants that can be determined experimentally for each type of liquid.

$V_0$ is the impact velocity of the fluid jet and $V_L$ is the kinematic viscosity.

It will be noted from this relationship that viscous liquids have a critical "splashing" pressure lower than that of liquids of low viscosity. There are therefore different possible strategies for dealing with splashing:
either promote direct splashing if the size distribution of the droplets is satisfactory;
or promote splash-free deposition by decreasing the operating pressure (this in most cases can be readily envisioned for viscous liquids since the vapor pressure of viscous liquids is lower than that of liquids that are less viscous);
or favor continuous jet injection (rather than droplet injection) in order to prevent any splashing that could not otherwise be easily prevented (depending on the properties of the liquid and the process constraints).

Figure 11:
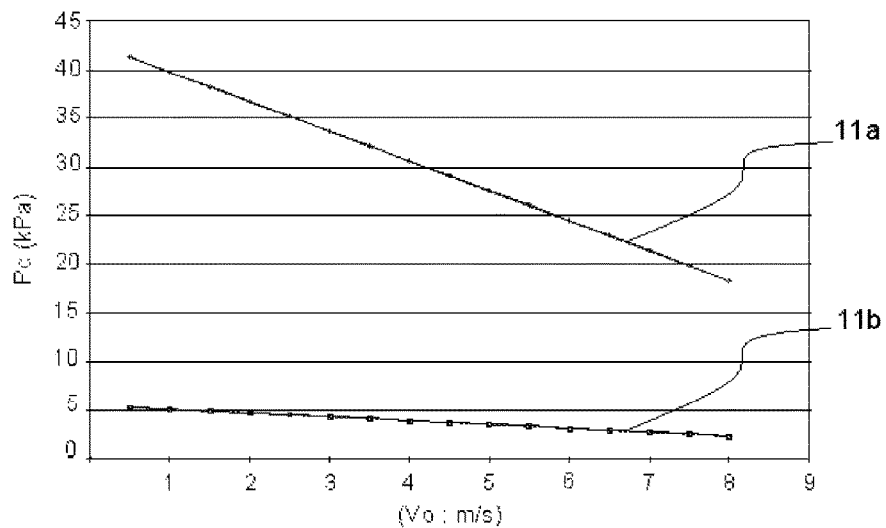
FIG. 11 illustrates the variation in the critical splashing pressure, effect corresponding to the impact of a volume of liquid on a solid surface inducing a fragmentation of this volume into a number of subvolumes, as a function of the impact velocity of a droplet.

In this respect, FIG. 11 illustrates the variation in the critical "splashing" pressure as a function of the velocity of a droplet for water (curve 11a) and for the "broth" (curve 11b).

Superhydrophilic surfaces may also advantageously be used to promote the formation of thin films. Nevertheless, this strategy per se is unsatisfactory because this hydrophilic property is highly dependent on surface finish (moreover, in addition, a too highly hydrophilic surface may also be disadvantageous preventing, in a second step, fragmentation of the film, which, for this to occur, must not be too strongly bound to the contact surface). Given that in most cases in industrial production it is not possible, during film formation, to prevent a deposit forming, the hydrophilic nature of the surface will generally only decrease over time. Therefore, it is necessary for optimal deposition conditions to be set using a combination of parameters and especially via optimized surface geometries.

Figure 12:
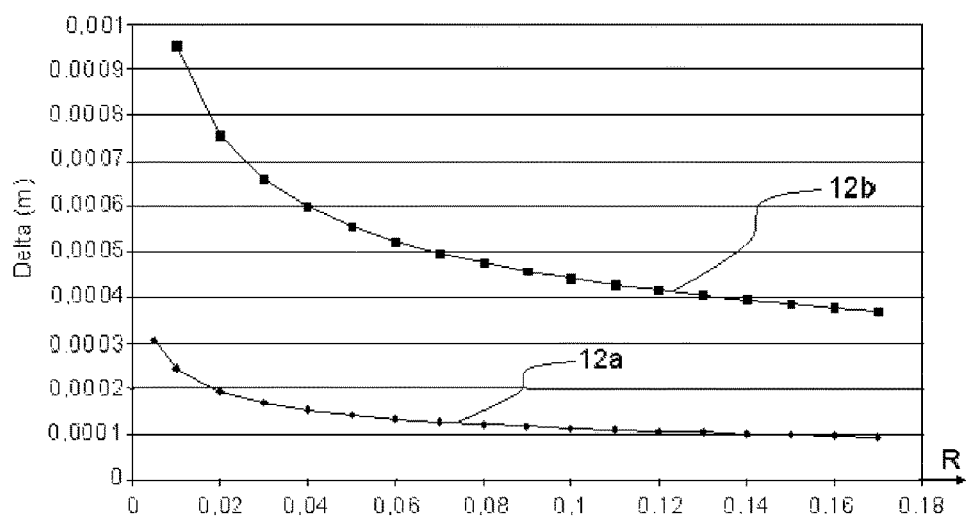
FIG. 12 illustrates the thickness of the liquid film flowing over a spherical dome of radius R for various types of liquid (flow rate of the flow 9 l/h)

In this respect, FIG. 12 illustrates the thickness Delta of a liquid film flowing over a spherical dome of radius R for various liquids—curve 12a: water, and curve 12b: the "broth".

Generally, in the case of fragmentation of primary droplets to gain principal droplets in order to obtain a relatively thin liquid film, it is ideally necessary to achieve the value $\beta_{max}$ (and therefore to wait the characteristic time τ).

Whatever impact mode is used: liquid jet or jet of primary droplets, the process of the present invention provides, in a second step, for the fragmentation of the film produced on the support, and proposes to exploit an effect known in the literature whereby a free surface is fragmented using energy delivered by applying vibrations, taking into account the fact that this effect depends in part on the natural frequency of the liquid in order to fragment it (thereby also setting the diameter of the droplets produced by the fragmentation).

In order to obtain a degree of freedom relative to this natural frequency, the present invention proposes to use a film of liquid the small thickness of which is controlled by the kinetic energy given to the liquid, this film moreover being subjected to vibrational energy delivered by a solid supporting surface. This approach makes it possible, via concomitant control of the thickness of the film and the frequency/amplitude of the supporting surface, to achieve a greater flexibility to obtain diameters over a wide droplet size distribution if necessary.

Moreover, to amplify this effect, the temperature of the supporting surface is itself controlled notably with respect to what is called the Leidenfrost temperature. This temperature is defined in the prior art and is associated with the thermodynamic effect whereby a droplet of liquid or fluid sprayed onto a very hot support becomes spherical. The Leidenfrost temperature is defined as the wall temperature for which the lifetime (i.e. the time before the liquid completely evaporates) of a droplet resting on this wall is maximized in a temperature range above the boiling point of the liquid considered.

It may then be envisioned to obtain droplets with a very small size distribution by:
controlling the thickness of the liquid film;
delivering sufficient vibrational energy to the film thus formed; and
exploiting the impact of the temperature of the wall.

Specifically, in the case where the vibrational energy applied to the wall is not appropriate or is nonexistent, either natural fragmentation of the drop occurs (with a wide droplet size distribution or even several populations, in terms of droplet diameter) or no fragmentation occurs.

In the case where the hot wall is subjected to appropriate vibrations, the principal droplets produced by the forced fragmentation of the primary droplet have a smaller average diameter and the size distribution of the principal droplets is narrower.

It will be recalled that, to obtain good fragmentation, it is necessary, to an order of magnitude, for the liquid film to be fragmented into elementary volumes the characteristic length of which is about the minimum thickness of the film. To do this, the vibration (or more precisely the oscillating travel of the impact surface) should advantageously repeat a minimum number of times corresponding to about the ratio Rmax/hmin, where Rmax is the maximum radius of the wetted surface resulting from the impact and hmin is the minimum thickness of the film (Rmax/hmin conventionally being between 5 and 15), in the length of time that the impact lasts (i.e. during the spreading). To a first approximation, the spreading time may be considered, under most conditions and for most liquids, to be between 1 and 5 ms; it is therefore necessary for the impact surface to vibrate at least at a frequency of about 1 kHz, by way of an order of magnitude.

Moreover, if the vibration frequency is too high droplets that are too small will be generated, forming a mist that is useless for the industrial applications targeted by the present invention, this frequency limit being about a few tens of kilohertz.

Figure 13:
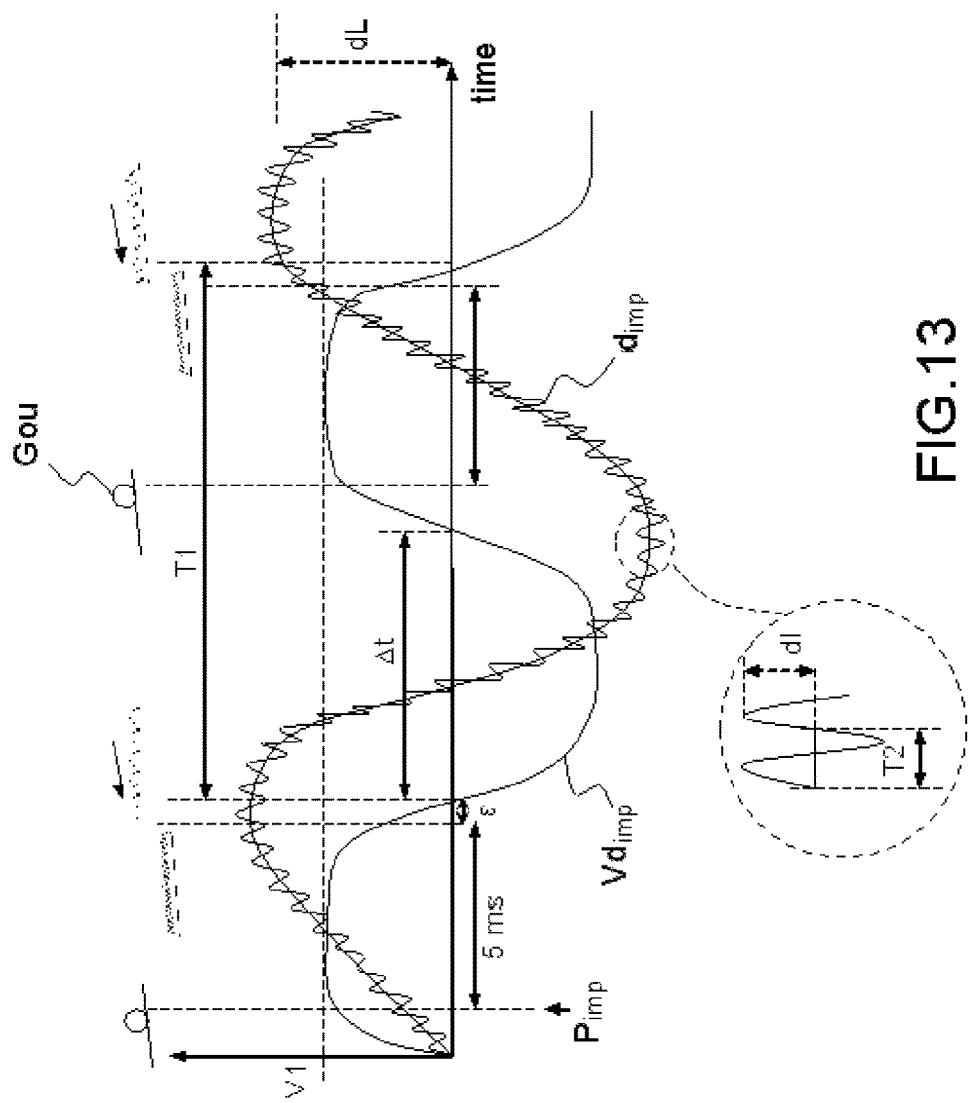
FIG. 13 illustrates a sequence of vibrations that can be applied according to one example of the process of the present invention, to optimize fragmentation of droplets on the surface of a planar wall subjected to heating.

FIG. 13 illustrates an example of possible sequencing between the various effects generated during the impact of a droplet on a hot flat vibrating surface. For reasons relating to the adjustment of the kinetic energy of the droplets Gou and to the vibrational frequencies to be applied to the liquid film, it is proposed, in one variant of the present invention, to apply two vibrations: one of period $T_1$ and amplitude d allowing the relative impact velocity to be adjusted, the other of period $T_2$ and amplitude dl setting the characteristic fragmentation length (and therefore the size of the principal droplets). The point of impact $P_{imp}$ symbolizes the impact of a primary droplet on the support, with the vibrations represented by a displacement velocity $v_{dimp}$, along an axis perpendicular to the plane of the support, and a displacement $d_{imp}$.

In the case where a flowing film is fragmented without prefragmentation, the fragmenting principle is the same as in the case described above except that the zone made to vibrate is (optionally) separate from the impact zone of the jet.

It will also be noted that in the case of a flowing film, the kinetic energy of the latter does not a priori tend to decrease notably (compared to the case of primary droplets) via the action of forces related to the viscosity and surface tension of the liquid (in contrast to the case of a droplet). The vibrational energy density (i.e. energy per unit mass of film to be fragmented) to be communicated to the liquid film to obtain the fragmentation may thus be considered to be higher (compared to the case of a droplet). There is therefore a compromise to be found between the thickness of the film (and therefore the kinetic energy to be communicated to the fluid to obtain it) and the vibrational energy required to ensure fragmentation.

Conventionally, the thickness sought for the flowing film may be similar to the thickness of liquid obtained when a droplet simply strikes a flat surface.

In the case of flowing films, the fragmentation frequencies may be higher than the case considered of fragmentation of droplets, without a mist being generated. In this sense, the frequencies applied will possibly exceed 20 kHz. Moreover, the energy transmitted by vibration must at least be higher than the kinetic energy of the flowing film.

To do this, the product of the frequency f×the amplitude a applied to the film must be higher than the flow rate $v_L$ of the latter: $a \cdot f > v_L$ (necessary condition for fragmentation of a flowing film).

Moreover, to a 1st order of magnitude, the amplitude must be similar to the thickness of the film. For all of these reasons, it may be useful to apply the vibrational energy not to the entire film but to just the thinnest portion of it.

Regarding the step of transporting the droplets formed in the direction of the precipitation liquid, it is important to keep said droplets in their spherical state. The temperature to be applied to the wall during the transportation is a particular temperature. Specifically, since the effects employed during fragmentation and transportation of the droplets are not completely the same, the temperature at the point of impact and that for the transportation may be different. For example, if the temperature of the wall in the impact zone is too high the liquid will rebound rather than fragment. Furthermore, too high a temperature will increase the rate of evaporation of the liquid from which the droplets are formed, but too low a temperature will mean that the gaseous interfacial film obtained is not sufficiently thick to preserve the sphericity of the droplet and to ensure the droplet is suspended above the wall.

If the temperature of the wall is too high (about 280-300° C. for water) the liquid may rebound, whereas if the temperature of the wall is too low the droplets will not be sufficiently spherical and their movement will be more erratic.

It will moreover be noted that the droplet transporting means may demand that the angle between the wall and the vertical be other than 90° in order to impart a preferred direction on the flow.

The means for separating or braking said principal droplets will now be described in more detail.

These means may especially use:
either an electrostatic effect to achieve a droplet size selection and also to brake the droplets produced (option 1);
or physical guiding and braking via dissipation of kinetic energy (option 2).

In option 1, the effect used is made relevant without strong fields necessarily being required due to the low displacement speeds of the droplets, enabling the force of gravity to be overcome and the droplets to be braked.

The first step to be carried out in order to allow the speed and trajectory of the droplets to be controlled for their transportation is the transmission of a charge, which possibly takes place at different stages in the droplet generating process. Because a charge is transmitted to the liquid, the droplets do not coalesce during their travel, thereby allowing their trajectory to be modified by application of an electric field E after the fragmentation. As illustrated in FIG. 10, this field may be applied between two capacitor plates (the charge may be transmitted to the liquid by applying a charge to the convex surface over which the liquid initially spreads). The deviation X induced in the initial trajectory (relative to the velocity vector Vo) is then given by the following expression:

$$X = \frac{3.\alpha.E}{R.v_0^2}\left(L - \frac{l}{2}\right)$$

where E is the electric field, R is the diameter of the droplet, vo the initial velocity on entering the electric field and α a constant of proportionality notably dependent on the nature of the liquid.

The electric field may thus be used to make a droplet size selection by modifying the trajectory of the droplets but may also be used to brake the trajectory once the selection has been carried out (or even potentially beforehand); in the latter case, the electric field E must globally be oriented almost in the opposite direction to the velocity vector characterizing the flow of droplets.

In the case of a field that is collinear with Vo (but of opposite direction), the braking time (i.e. the time required to reduce the initial velocity Vo to zero) is given by the following expression:

$$t = \frac{V_0.R}{\alpha'.E}$$

where α' is a constant of proportionality notably dependent on the nature of the liquid.

Generally, it is not desired to completely stop the droplet but only to sufficiently decrease its displacement velocity, i.e. to a velocity compatible with the envisioned industrial application. In the case of a sol-gel process, the required velocity may be lower than 10 cm/s.

In option 2, in the case of physical guiding and braking via dissipation of kinetic energy, the Leidenfrost effect is exploited allowing the liquid droplets to be made to rebound from a hot wall. FIG. 10 illustrates this possibility by showing guiding grooves (which may optionally be charged with a charge of opposite polarity to that of the droplets).

Figure 14:
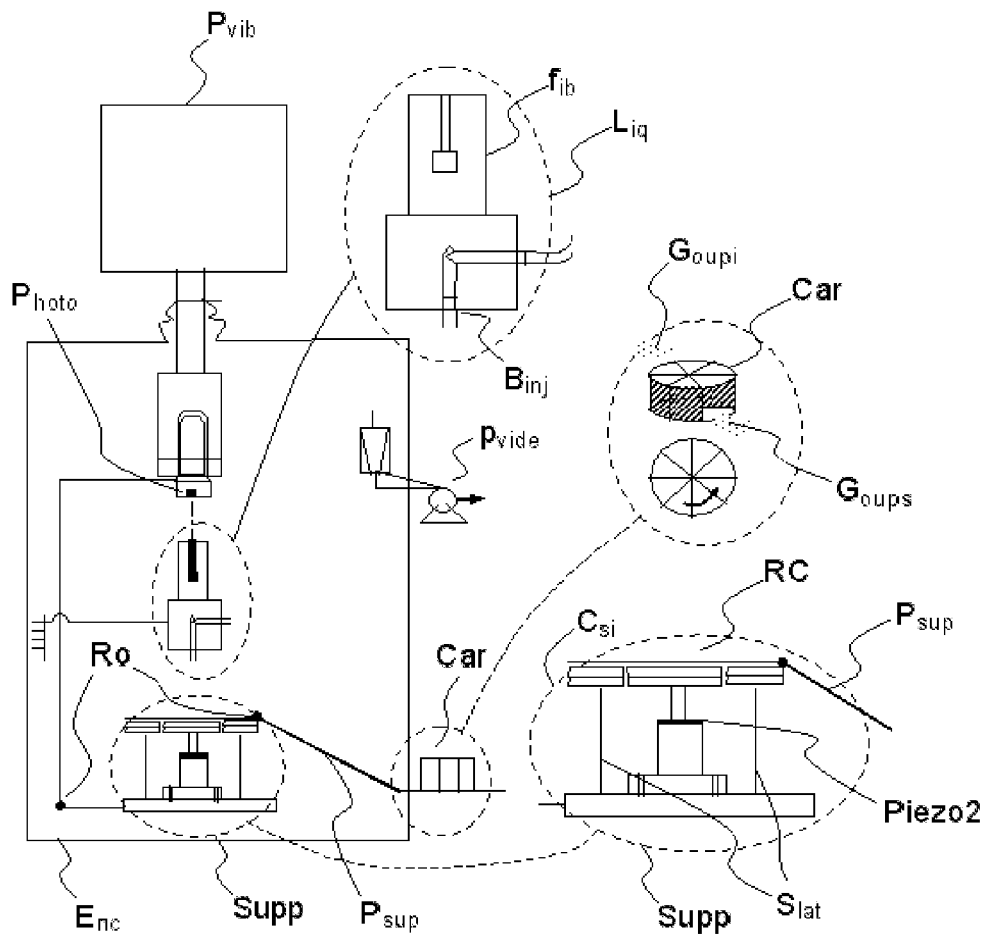
FIG. 14 illustrates an example of a complete device according to the invention.

FIG. 14 illustrates a complete example of a device according to the invention allowing the droplet generating process of the invention to be implemented.

This device comprises a chamber $E_{nc}$ that has advantageously been pumped down by a vacuum pump $p_{vide}$. This chamber comprises a support assembly $S_{upp}$ comprising means Csi for receiving and heating the liquid or the primary droplets intended to form a film, and means for making said film vibrate (via $P_{vib}$ and $P_{iezo2}$) in order to form the desired principal droplets.

An enlarged view illustrates a support being made to vibrate, said support comprising heating elements RC, an element $P_{iezo2}$, and lateral elements $S_{lat}$ that strengthen the assembly. By way of example, high-heat-flux (typically higher than 5 W/cm$^2$), low-weight, flexible resistance heaters made of Teflon or a similar material may be used in order to make it easy for them to be made to vibrate at the recommended frequencies and so that they can resist any chemical attacks that may occur.

The chamber comprises a liquid injection system, comprising an injection nozzle $B_{inj}$ fed with a liquid $L_{iq}$.

Centering means allowing the zone of impact of the liquid or primary droplets on the vibrating support to be controlled are advantageously provided and comprise optical adjustment and visualization means. More precisely, for this purpose, the chamber is equipped with an optical fiber $f_{ib}$ coupled to a photodiode $P_{hoto}$.

Means for collecting the principal droplets formed are also incorporated in said chamber and must be placed in communication with the exterior of the chamber for passage to a zone for collecting said droplets. For this purpose, an upper plate $P_{sup}$ may advantageously be provided, serving as a ramp between the support and an airtight system for transferring droplets from the vacuum chamber to the exterior of the latter, this system typically being a carousel $C_{ar}$.

An enlarged view of said carousel shows a flow of droplets $G_{oupi}$ entering the carousel, which droplets are sorted in the carousel and exit therefrom, after being braked, as a flow of droplets $G_{oups}$, the carousel moreover serving as an airlock, i.e. it enables the pressure to be staggered between that applied during the impact of the liquid on the solid support and that applied during the processing of the droplets for their subsequent use.

Generally, all of the parameters involved in the operation of the device described above may be controlled by a control system such as described below.

More precisely, such a control system is intended to adjust the operating parameters of the process/device in order to approach an average diameter setpoint for the droplets generated and/or a generation rate for the latter. To do this, the following parameters may be used as input data:

$V_0$, the impact velocity of the droplets or the liquid jet, adjustable via ΔPr (pressure of the reservoir from which liquid is supplied) or via the movement of the vibrating impact surface; it will be noted that the defining parameter is above all the relative impact velocity Vr, i.e. the velocity between the plate and the droplets or jet;

$D_0$, the diameter of the droplets or that of the liquid jet before impact;

$f_1$, the frequency of vibration of the solid surface of high amplitude $a_1$;

$f_2$, the frequency of vibration of the solid surface of low amplitude $a_2$;

$Tp_1$, the temperature of the wall impacted;

$Tp_2$, the temperature of the wall ensuring transportation of the secondary droplets;

$\Delta E_0$, the potential difference allowing the liquid to be fragmented to be charged;

$E_1$, the electrostatic field enabling a selection of the droplet size of the droplets generated;

$E_2$, the braking electrostatic field;

$\theta_1$ and $\theta_3$, respectively the impact angle between the normal to the surface for forming the liquid film and the velocity vector of the falling droplets or the liquid jet, and the angle between the vertical and the transportation plane of the droplets generated; and P, the pressure of the atmosphere at the solid surface struck by the droplets.

As for the length l (length of the capacitor plates) it is fixed. It may moreover be envisioned to modify the properties of the liquid to be fragmented in order to benefit during the process from favorable effects. This may notably be achieved by:

potentially adding a missile compound having a lower evaporation temperature than the liquid to be fragmented notably in order to amplify the Leidenfrost effect and increase the lifetime of the droplets;

potentially adding a compound that causes viscosity and/or surface tension to decrease.

In order to adjust the control parameters, the aforementioned laws are used by a processor that also incorporates a controller (for example a PID i.e. what is called a proportional-integral-derivative controller (conventional command/control electronics) in order to guarantee that a diameter setpoint for the (principal) droplets (and/or the velocity of the latter) is respected, the target of which (average diameter and/or droplet size and/or velocity) is measured via optical diagnosis supplemented with image analysis if necessary.

The aforementioned parameters may for example advantageously lie in the following ranges:

| Parameters | Lower limit | Upper limit |
| --- | --- | --- |
| Vr | 0.1 (m/s) | 100 (m/s) |
| Vo | 0.1 (m/s) | 50 (m/s) |
| Do | 0.1 mm | 20 mm |
| f1 | 0 kHz | 5 kHz |
| f2 | 0 kHz | 30 kHz |
| Tp1 | 120° C. | 250° C. |
| Tp2 | 150° C. | 300° C. |
| DE0 | 5 kV | 60 kV |
| E1 | 0.1 kV/cm | 5 kV/cm |
| E2 | 0.1 kV/cm | 5 kV/cm |
| $\theta_1$ | 0° | 30° |
| $\theta_3$ | 30° | 90° |
| P | 0.1 bar | 1 bar |
| a1 * f1 | 0.1 (m/s) | 50 (m/s) |
| a2 | 0.001 mm | 0.2 mm |

Moreover, it may be advantageous under certain conditions (notably with respect to narrowing particle size range) for the parameter pair ($D_0$, Vr) to respect the following inequality:

$$D_0^3 . V_R^5 \geq \frac{10^8 . \sigma^2 . \mu}{\rho^3}$$

For a liquid the viscosity and surface tension properties of which are similar to those of water, to obtain droplets of about 100 μm in size, the following indicative values of parameters to be adjusted represent suitable values.

Conditions for generating droplets that are 100 μm in size (case of water)

| Parameters | Indicative values |
|---|---|
| Vr | 10 m/s |
| D0 | 2 mm |
| Tp1 | 200° C. |
| a1 | $5 \times 10^{-3}$ m |
| a2 | $50 \times 10^{-6}$ m |
| f1 | 0.1 kHz |
| f2 | 1 kHz |

The invention claimed is:

1. A process for generating droplets with a modulatable droplet size distribution, the process comprising the following steps:

making a stream of liquid strike a support with a given relative impact velocity;

making said support vibrate at at least one vibration frequency;

heating said support to an impact temperature such that a liquid film formed by the impact and made to vibrate is heated to a principal temperature so as to form in combination principal droplets from said liquid film; and transporting said droplets via a transfer/braking/sorting system to a liquid for precipitating the principal droplets, said transporting being carried out at a transportation temperature, wherein the principal temperature is different than the transportation temperature, performing an electrical charging operation during said transporting of the previously formed principal droplets to keep said principal droplets isolated from one another, all of the relative impact velocity, the vibration frequency, the principal temperature and the transportation temperature allowing the droplet size of said formed principal droplets and the velocity of the latter to be modulated; and wherein a continuous jet of fluid is provided in order to obtain a high droplet flow rate, and wherein said support makes an angle ($\theta_1$) smaller than about ten degrees with a direction normal to the direction of said continuous jet of fluid.

2. The process for generating droplets with a modulatable droplet size distribution as claimed in claim 1, further comprising a step of prefragmenting said liquid so as to produce primary droplets, which primary droplets strike said support with a medium flow rate.

3. The process for generating droplets with a modulatable droplet size distribution as claimed in claim 2, wherein the prefragmenting step is carried out by making said liquid vibrate.

4. The process for generating droplets with a modulatable droplet size distribution as claimed in claim 2 further comprising making said support vibrate during a first period and with a first vibration amplitude so as to influence the impact velocity of said primary droplets, and making said support vibrate during a second period and with a second amplitude so as to adjust the droplet size of the principal droplets by way of the film obtained from the primary droplets, these steps being concomitant.

5. The process for generating droplets with a modulatable droplet size distribution as claimed in claim 1 further comprising a step of prefragmenting said liquid so as to produce primary droplets and subjecting the primary droplets formed to an electric field so as to reduce coalescence of said droplets and to allow the droplets to be braked/sorted via an electrostatic effect.

6. The process for generating droplets with a modulatable droplet size distribution as claimed in claim 1, wherein the impact temperature is located between a boiling point of the liquid to be broken up and a Leidenfrost temperature of the desired principal droplets, the transportation temperature belonging to a range of temperatures near said Leidenfrost temperature.

7. The process for generating droplets with a modulatable droplet size distribution as claimed in claim 1, wherein the liquid is a viscous liquid possessing a viscosity higher than about ten centipoises and being uranyl nitrate or an actinide solution containing a rheology adjusting additive.

8. The process for generating droplets with a modulatable droplet size distribution as claimed in claim 1, wherein the film formed is about 100 to 200 microns in thickness, the vibration frequencies being less than or equal to about 30 kilohertz.

9. The process for generating droplets with a modulatable droplet size distribution as claimed in claim 1, wherein the impact velocity is about 0.1 meters/second to about a hundred meters/second.

10. The process for generating droplets with a modulatable droplet size distribution as claimed in claim 1, wherein all of the steps are carried out in a chamber that is under vacuum relative to the atmosphere outside said chamber.

11. A device for generating droplets with a modulatable droplet size distribution, comprising:

means for spraying a liquid onto a support so as to make said liquid strike said support;

means for adjusting an impact velocity of said liquid;

means for making said support vibrate at a principal frequency and means (RC) for heating said support to a temperature such that said liquid is heated to a principal temperature so as to form principal droplets from a liquid film;

means for transporting said principal droplets, said transportation being carried out at a transportation temperature; and a control system configured to adjust an operating parameter of the device in order to approach an average diameter setpoint for the droplets generated and/or a generation rate for the latter; and wherein a collecting means comprise means for transporting said droplets to a solution for precipitating the droplets, and wherein the transporting means comprise electromagnetic braking means.

12. The device for generating droplets with a modulatable droplet size distribution as claimed in claim 11, further comprising a reservoir of pressurized liquid and an injector.

13. The device for generating droplets with a modulatable droplet size distribution as claimed in claim 11, wherein the spraying means spray a continuous flowing film onto the support to be struck and said support has a surface that is not flat and that has a concave axisymmetric three-dimensional and hemispherical shape.

14. The device for generating droplets with a modulatable droplet size distribution as claimed in claim 11, wherein the means for spraying the fluid comprise means for prefragmenting said liquid into primary droplets and means for spraying said primary droplets onto said support.

15. The device for generating droplets with a modulatable droplet size distribution as claimed in claim 14, wherein the means for prefragmenting the liquid into primary droplets comprise a straight or tapered outlet of the nozzle type.

16. The device for generating droplets with a modulatable droplet size distribution as claimed in claim 14, wherein the prefragmenting means comprise an ultrasound generator comprising a piezoelectric transducer generating vibrations at a preliminary frequency.

17. The device for generating droplets with a modulatable droplet size distribution as claimed in claim 14, wherein the prefragmenting means furthermore comprise an anti-overflow system.

18. The device for generating droplets with a modulatable droplet size distribution as claimed in claim 11, wherein the support comprises guiding grooves for collecting the principal droplets.

19. The device for generating droplets with a modulatable droplet size distribution as claimed in claim 11, wherein the means for making the support vibrate comprise a piezoelectric element.

20. The device for generating droplets with a modulatable droplet size distribution as claimed in claim 11, wherein the transporting means comprise a ramp inclined relative to said support.

21. The device for generating droplets with a modulatable droplet size distribution as claimed in claim 11, characterized in that it furthermore comprises means for sorting said principal droplets.

22. The device for generating droplets with a modulatable droplet size distribution as claimed in claim 21, wherein the sorting means comprise a carousel receptacle actuated in rotation.

23. The device for generating droplets with a modulatable droplet size distribution as claimed in claim 12, further comprising:
a chamber comprising the means for spraying said liquid, said support and the means for making said support vibrate; and
means for creating a vacuum in said chamber.

24. A process for generating droplets with a modulatable droplet size distribution, the process comprising the following steps:
making a stream of liquid strike a support with a given relative impact velocity;
making said support vibrate at at least one vibration frequency;
heating said support to an impact temperature such that a liquid film formed by the impact and made to vibrate is heated to a principal temperature so as to form in combination principal droplets from said liquid film; and
transporting said droplets via a transfer/braking/sorting system to a liquid for precipitating the principal droplets, said transporting being carried out at a transportation temperature,
all of the relative impact velocity, the vibration frequency, the principal temperature and the transportation temperature allowing the droplet size of said formed principal droplets and the velocity of the latter to be modulated,
wherein a continuous jet of fluid is provided in order to obtain a high droplet flow rate, and
wherein said support makes an angle ($\theta_1$) smaller than about ten degrees with a direction normal to the direction of said continuous jet of fluid.

25. A device for generating droplets with a modulatable droplet size distribution, comprising:
means for spraying a liquid onto a support so as to make said liquid strike said support;
means for adjusting an impact velocity of said liquid;
means for making said support vibrate at a principal frequency and means (RC) for heating said support to a temperature such that said liquid is heated to a principal temperature so as to form principal droplets from a liquid film; and
means for transporting said principal droplets, said transportation being carried out at a transportation temperature;
wherein a collecting means comprises means for transporting said droplets to a solution for precipitating the droplets; and
wherein the transporting means comprises electromagnetic braking means.

26. A process for generating droplets with a modulatable droplet size distribution, the process comprising the following steps:
making a stream of liquid strike a support with a given relative impact velocity;
making said support vibrate at at least one vibration frequency;
heating said support to an impact temperature at a temperature below 300° C. such that a liquid film formed by the impact and made to vibrate is heated to a principal temperature so as to form in combination principal droplets from said liquid film; and
transporting said droplets via a transfer/braking/sorting system to a liquid for precipitating the principal droplets, said transporting being carried out at a transportation temperature,
all of the relative impact velocity, the vibration frequency, the principal temperature and the transportation temperature allowing the droplet size of said formed principal droplets and the velocity of the latter to be modulated,
wherein a continuous jet of fluid is provided in order to obtain a high droplet flow rate, and
wherein said support makes an angle ($\theta_1$) smaller than about ten degrees with a direction normal to the direction of said continuous jet of fluid.

27. A process for generating droplets with a modulatable droplet size distribution, the process comprising the following steps:
making a stream of liquid strike a support with a given relative impact velocity;
making said support vibrate at at least one vibration frequency;
heating said support to an impact temperature such that a liquid film formed by the impact and made to vibrate is heated to a principal temperature so as to form in combination principal droplets from said liquid film; and transporting said droplets via a transfer/braking/sorting system to a liquid for precipitating the principal droplets, said transporting being carried out at a transportation temperature, all of the relative impact velocity, the vibration frequency, the principal temperature and the transportation temperature allowing the droplet size of said formed principal droplets and the velocity of the latter to be modulated, further comprising a step of prefragmenting said liquid so as to produce primary droplets, which primary droplets strike said support with a medium flow rate, wherein the prefragmenting step is carried out by making said liquid vibrate, wherein a continuous jet of fluid is provided in order to obtain a high droplet flow rate, and wherein said support makes an angle ($\theta_1$) smaller than about ten degrees with a direction normal to the direction of said continuous jet of fluid.

\* \* \* \* \*